June 29, 1965 E. H. B. BARTELINK 3,192,524
SPEED MEASURING APPARATUS
Original Filed Feb. 8, 1955
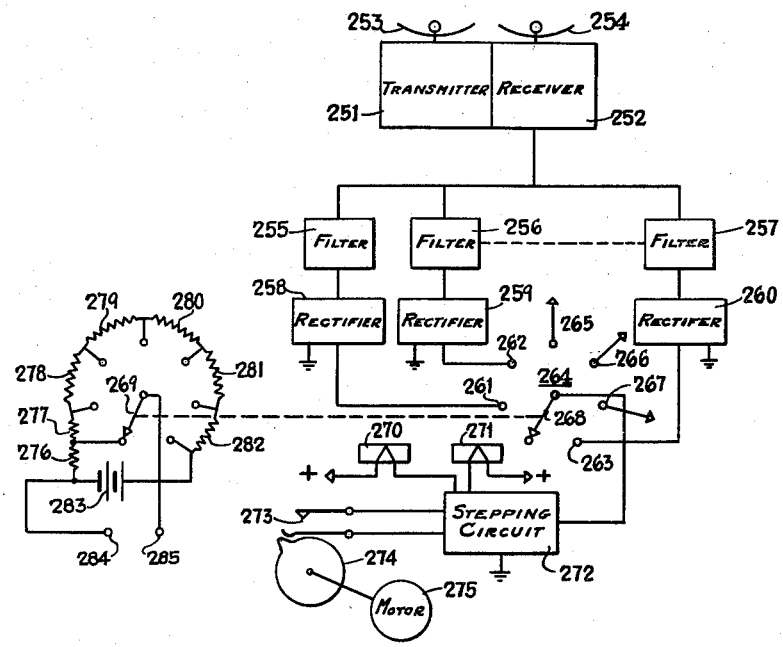
Inventor
EVERHARD H. B. BARTELINK.
By Ward, Neal, Haselton, Orme & McElhannon
Attorneys.

United States Patent Office 3,192,524
Patented June 29, 1965

3,192,524
SPEED MEASURING APPARATUS
Everhard H. B. Bartelink, P.O. Box 425, Concord, N.H.
Original application Feb. 8, 1955, Ser. No. 486,873, now Patent No. 2,999,999. Divided and this application Aug. 11, 1961, Ser. No. 130,911
5 Claims. (Cl. 343—8)

This invention relates to speed measuring apparatus and particularly to electrical apparatus for measuring the speed of the slowest vehicle in a group of vehicles on a roadway.

In my copending application, Serial No. 486,873, filed February 8, 1955, and entitled "Highway Traffic Control System," now Patent No. 2,999,999, of which this application is a division, a traffic control system for regulating the speed of traffic on a highway in accordance with the variation of certain conditions of such highway is described. This application is directed to the apparatus shown in said copending application used for measuring the speed of the slowest vehicle in a group of vehicles on a roadway and to provide information to computing apparatus used in the traffic control system for determining the maximum safe speed.

One object of the invention is to provide apparatus which will measure the speed of a group of vehicles on a roadway and which will control an electrical circuit in accordance with the speed of the slowest vehicle in the group.

Another object of the invention is to provide apparatus which may be unattended and which will periodically determine the speed of the slowest vehicle in a group of vehicles on a roadway.

Other objects of the invention will be apparent from the following detailed description of the preferred embodiment thereof, which description should be considered in conjunction with the accompanying drawing in which the single figure thereof is a combined block and circuit diagram of the preferred embodiment of the invention.

The preferred embodiment of the invention illustrated in FIG. 1 includes a well-known type of speed measuring device comprising a raido frequency transmitter 251 and a radio frequency receiver 252, the transmitter 251 having a transmitting antenna 253 coupled thereto and the receiver 252 having a receiving antenna 254 coupled thereto. The receiver 252 compares the frequency of the radio frequency energy reflected by a moving vehicle with the frequency of the transmitted energy and provides a beat frequency output signal whose frequency is related to the speed of the vehicle. Thus, a slow moving vehicle will provide a low frequency signal at the output of receiver 252 and a fast moving vehicle will provide a high frequency signal at the output of receiver 252, the frequency of both signals being in the audio frequency range.

The output of the receiver 252 is coupled to a plurality of filters 255, 256, 257, etc. which filters may be either band pass filters or low pass filters. Thus, filter 255 would pass a signal corresponding to a vehicle speed of 20 miles per hour or would pass signals corresponding to vehicle speeds up to 20 miles per hour; filter 256 would pass signals corresponding to vehicle speeds of approximately 30 miles per hour or would pass signals corresponding to vehicle speeds up to 30 miles per hour, etc. The output of each filter is connected to a rectifier such as rectifiers 258, 259, 260, etc. which rectify the signals passed by the associated filters so that a D.C. voltage appears at the output of a rectifier when it receives a signal from its associated filter. Contacts 261, 262 and 263 of an electrical stepping switch 264 are connected to the outputs of rectifiers 258, 259, 260 and contacts 256, 266, 267 are connected to the outputs of similar rectifiers connected to other filters, such similar rectifiers and other filters being the same as those shown in FIG. 1 but being omitted in the drawing for the purpose of simplicity in illustration.

The stepping switch 264 has a pair of arms 268 and 269 which are driven together. The stepping switch 264 also includes a release magnet 270 which returns the arms 268 and 269 to the position shown when the magnet 270 is energized and a stepping magnet 271 which causes the arms to move in succession to the contacts of the switch 264. Magnets 270 and 271 are connected to a stepping circuit 272 of a type well known in the art which energizes the magnet 271 and causes the arms 268 and 269 to step successively to the various contacts until the arm 268 reaches one of the contacts associated therewith which is at a predetermined potential with respect to ground. When the arm 268 reaches such a contact, the stepping circuit 272 discontinues its energization of magnet 271 so that the arms 268 and 269 remain at positions corresponding to the aforesaid contact until the release magnet 270 is energized. Accordingly, the arms 268 and 269 will stop at positions corresponding to the speed of the slowest vehicle within the range of the transmitter 251 and the receiver 252.

A pair of contacts 273 are associated with the stepping circuit 272 and are periodically closed by a cam 274 driven by a motor 275. When the contacts 273 are closed, the release magnet is energized, returning the arms 268 and 269 to the position shown in FIG. 1 and the stepping circuit 272 is reset. Subsequently, the stepping circuit steps the arms 268 and 269 in the manner heretofore described.

A plurality of resistors 276–282 are connected across voltage source 283 and are connected to the contacts associated with the arm 269. The resistors 276–282 act as a voltage divider and the voltage between the terminals 284 and 285 will be dependent upon the position of the arm 269. Thus, the magnitude of the voltage between the terminals 284 and 285 is related to and will indicate the speed of the slowest vehicle within the range of the transmitter 251 and the receiver 252.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

I claim:
1. Means for indicating the speed of the slowest vehicle on a highway comprising means for measuring the speed of vehicles in a predetermined section of a highway including means for transmitting energy of a predetermined radio frequency, and means for receiving portions of said energy reflected by said vehicles and for providing signals having frequencies which are related to the speeds of the reflecting vehicles; a plurality of means connected to said receiving means for separating said signals according to their frequencies; detecting means for detecting signals at the outputs of said separating means, said detecting means being selectively connectible to said separating means and being operable by said last-mentioned signals to control the connection thereof to said separating means; and means controlled by said detecting means for providing a plurality of different voltages each one of which represents a different connection between said detecting means and said separating means.

2. Means for indicating the speed of the slowest vehicle of a group of vehicles in a predetermined area comprising means for transmitting radio frequency energy into said area and receiving such energy reflected by vehicles in said area, means connected to said receiving means for converting received energy into signals having frequencies which are related to the speeds of said vehicles, the lowest frequency signal corresponding to the speed of the slowest vehicle, a plurality of filters, each passing signals of a different frequency, connected to said converting means, detecting means for detecting the output energy of said filters, scanning means for successively connecting said detecting means to each of said filter means commencing with the filter means passing the lowest frequency signal and then to the filter means passing the signal having the next highest frequency, said scanning means being responsive to the output energy of said filter means for interrupting the scanning of said filter means upon connection of said detecting means to a filter means having a signal present therein, an electrical circuit having a variable control for varying an electrical characteristic of said circuit, and means interconnecting said control and said scanning means whereby the position of said control is controlled by said scanning means.

3. Means for indicating the speed of the slowest vehicle of a group of vehicles in a predetermined area comprising means for transmitting radio frequency energy into said area and receiving such energy reflected by vehicles in said area, means connected to said receiving means for converting received energy into signals having frequencies which are related to the speeds of said vehicles, the lowest frequency signal corresponding to the speed of the slowest vehicle, a plurality of filters, each passing signals of a different frequency, connected to said converting means, means successively connectible to the outputs of said filters and connectible first to the filter passing signals of the lowest frequency and then to the outputs of filters passing signals of higher frequencies, means for stopping said successively connectible means at the first of the energy outputs having a signal present therein, an electrical circuit having a variable control for varying an electrical characteristic of said circuit, means interconnecting said control and said successively connectible means whereby the position of said control is controlled by the position of the successively connectible means, and means for periodically operating said successively connectible means.

4. Means for indicating the speed of the slowest vehicle of a group of vehicles in a predetermined area comprising means for transmitting radio frequency energy into said area and receiving such energy reflected by vehicles in said area, means connected to said receiving means for converting received energy into signals having frequencies which are related to the speeds of said vehicles, the lowest frequency signal corresponding to the speed of the slowest vehicle, a plurality of filters, each passing signals of a different frequency, connected to said converting means, means successively connectible to the outputs of said filters and connectible first to the filter passing signals of the lowest frequency and then to the outputs of filters passing signals of higher frequencies, means for stopping said successively connectible means at the first of the filter outputs having a signal present therein, a potentiometer having an arm, means interconnecting said arm and said successively connectible means whereby the position of said arm is controlled by the position of the successively connectible means, and means for periodically operating said successively connectible means.

5. Means for indicating the presence of a vehicle having a predetermined speed in a group of vehicles in a predetermined area comprising means for transmitting radio frequency energy into said area and receiving such energy reflected by vehicles in said area, means connected to said receiving means for converting received energy into signals having frequencies which are related to the speeds of said vehicles and including said predetermined speed, a plurality of means for segregating said signals in accordance with their frequencies connected to said converting means, one of said segregating means segregating the signals having a frequency corresponding to said predetermined speed, detecting means for detecting the output energy of said segregating means, and scanning means connected to said detecting means and said segregating means, said scanning means connecting said detecting means successively to the outputs of said segregating means and being controlled by the signals at the output of said segregating means and operable by the presence of a signal at the output of said one segregating means for interrupting the operation of said scanning means.

References Cited by the Examiner
UNITED STATES PATENTS

| 2,878,467 | 3/59 | Barker | 343—8 |
| 3,121,856 | 2/64 | Finney | 343—9 |

CHESTER L. JUSTUS, *Primary Examiner.*